United States Patent
Frayer (10) Patent No.: US 9,885,613 B1
(45) Date of Patent: Feb. 6, 2018

(54) HYBRID CATADIOPTRIC SYSTEM FOR ADVANCED OPTICAL CAVITY VELOCIMETRY

(71) Applicant: National Security Technologies, LLC, Las Vegas, NV (US)

(72) Inventor: Daniel K. Frayer, Los Alamos, NM (US)

(73) Assignee: National Security Technologies, LLC, North Las Vegas, NV (US)

(*) Notice: Subject to any disclaimer, the term of this patent is extended or adjusted under 35 U.S.C. 154(b) by 997 days.

(21) Appl. No.: 14/216,987

(22) Filed: Mar. 17, 2014

Related U.S. Application Data (60) Provisional application No. 61/800,066, filed on Mar. 15, 2013.

(51) Int. Cl.
*G01J 7/00* (2006.01)

(52) U.S. Cl.
CPC ........................................ *G01J 7/00* (2013.01)

(58) Field of Classification Search
CPC .......................................................... G01J 7/00
USPC ............................................................ 356/27
See application file for complete search history.

(56) References Cited

U.S. PATENT DOCUMENTS

| | | |
|---|---|---|
| 1,438,360 A | 12/1922 | Churchill |
| 2,800,641 A | 7/1957 | Falge et al. |
| 4,166,695 A | 9/1979 | Hill et al. |
| 4,346,991 A | 8/1982 | Gardner et al. |
| 4,743,110 A | 5/1988 | Arnaud et al. |
| 4,887,310 A | 12/1989 | Meyzonnette et al. |
| 4,902,888 A | 2/1990 | Kondo |
| 4,929,080 A | 5/1990 | Burstyn |
| 5,013,928 A | 5/1991 | Ikeda et al. |
| 5,040,886 A | 8/1991 | Gunter |
| 5,071,239 A | 12/1991 | Hoffman et al. |
| 5,483,632 A | 1/1996 | Kuwamoto et al. |
| 5,587,785 A | 12/1996 | Kato et al. |
| 5,812,250 A | 9/1998 | Ishida et al. |
| 6,075,600 A | 6/2000 | Nagano et al. |
| 6,542,226 B1 | 4/2003 | Wernet |
| 6,762,827 B2 | 7/2004 | Aroussi et al. |
| 7,397,549 B2 | 7/2008 | Williams et al. |
| 8,120,757 B2 | 2/2012 | Dede et al. |
| 8,711,336 B1 | 4/2014 | Frogget et al. |

(Continued)

OTHER PUBLICATIONS

"Aspheric Lens" Wikipedia, the free encyclopedia, http://en.wikipedia.org/wiki/Asphere, Mar. 4, 2014, 6 pages.

(Continued)

*Primary Examiner* — Tarifur Chowdhury
*Assistant Examiner* — Omar Nixon
(74) *Attorney, Agent, or Firm* — Weide & Miller, Ltd.

(57) ABSTRACT

A probe including reflector is disclosed to measure the velocity distribution of a moving surface along many lines of sight. Laser light, directed to the surface by the probe and then reflected back from the surface, is Doppler shifted by the moving surface, collected into probe, and then directed to detection equipment through optic fibers. The received light is mixed with reference laser light and using photonic Doppler velocimetry, a continuous time record of the surface movement is obtained. An array of single-mode optical fibers provides an optic signal to one or more lens groups and a reflector, such as a parabolic reflector having a mirrored interior surface.

20 Claims, 7 Drawing Sheets

(56) References Cited

U.S. PATENT DOCUMENTS

| | | | | |
|---|---|---|---|---|
| 2002/0091321 A1* | 7/2002 | Goldstein | ............ | A61B 5/0059 |
| | | | | 600/476 |
| 2003/0231829 A1 | 12/2003 | Meyers et al. | | |
| 2007/0156021 A1 | 7/2007 | Morse et al. | | |
| 2007/0165205 A1* | 7/2007 | Williams | ................ | F41G 7/226 |
| | | | | 356/5.15 |
| 2010/0253949 A1* | 10/2010 | Adler | ................... | A61B 5/0066 |
| | | | | 356/479 |
| 2010/0280398 A1* | 11/2010 | Hachiga | ............... | A61B 5/0285 |
| | | | | 600/504 |

OTHER PUBLICATIONS

"Studies of the wind filtering effect of gravity waves observed at allahabad (25.45 N, 81.85 E) in India", G.K. Mukherjee, et al., Earth Planets Space, 62, 309-318, 2010, Mar. 4, 2010, 10 pages.

U.S. Appl. No. 14/214,234, Robert M. Malone, et al.

\* cited by examiner

HYBRID CATADIOPTRIC SYSTEM FOR ADVANCED OPTICAL CAVITY VELOCIMETRY

2. PRIORITY CLAIM

This application claims priority to and the benefit of U.S. Provisional Patent Application No. 61/800,066 filed on Mar. 15, 2013.

1. STATEMENT REGARDING FEDERAL RIGHTS

This invention was made with government support under Contract No. DE-AC52-06NA25946 and was awarded by the U.S. Department of Energy, National Nuclear Security Administration. The government has certain rights in the invention.

3. FIELD OF THE INVENTION

This invention relates to photonic Doppler velocimetry and in particular to a method and apparatus for multipoint photonic Doppler velocimetry using optical lens elements.

4. RELATED ART

Photonic Doppler velocimetry (PDV) can be used to monitor movement of a curved surface that is moving along multiple points, such as during an experiment. The movement of the curved surface may occur due to an implosion, explosion, or any other force or factor that causes movement of the surface. Such movement often occurs during dynamic material experiments. These dynamic material experiments frequently involve complicated geometries and therefore large numbers of data points are a distinct advantage. Various solutions have been proposed to record the movement of the surface, but each of these various solutions suffer from various drawbacks.

One proposed prior art solution for measurement of the moving curved surface is the use of electrical shorting pins. In such a configuration, electrical shorting pins of various lengths were used to contact the moving service. An electrical pin provides a shorting signal between the surface and the pin tip when the tip of the pin comes into contact with the moving surface. Each electrical shorting pin gives a single timing point when the collapsing surface contracts the pin. Each length of a pin records one distance, so that many different lengths of pins are needed to follow the movement of an imploding surface. However, longer pins can interfere with the surface movement and interfere with the shorter pins. As a result, data may be corrupted by the interference. In addition, data is only collected by a pin when that pin contacts the moving surface. Movement prior to contact with the pin is not recorded. Moreover, a dense array of pins at many lengths is needed and this density may not be possible to achieve while also achieving desired data recordation.

Several different optical designs have been proposed to measure the behavior of the moving surface. One such proposed solution involves a ball shaped housing with discrete fibers pointed outward toward the surface of interest. This solution provided optic monitoring but it suffered from being size limited. As the number of optic fiber points is increased, this probe eventually comes to its limit in how small the entire group can be made, while still having reasonable optical fiber bending radii. The bend radius of the optic fibers limit size reductions in the probe and there is a limit to the number of fibers which may be packed in the probe.

Therefore, there is a need in the art for an accurate and cost effective light delivery and collection system for use as a collection probe in a PDV system.

SUMMARY

A new lens design with reflector is disclosed for use in probe (which may be of any size or miniaturized) to measure the velocity distribution of a moving surface along many lines of sight. An optic signal is directed to the surface of interest and the reflection from the surface, during movement of the surface, is processed to obtain information about the surface movement. The optic signal may be laser light. The optic signal is scattered back along each beam projected on the surface and is Doppler shifted by the moving surface before being collected by the probe and directed into the fiber. The received light is mixed with reference laser light in each optical fiber, in a technique called photonic Doppler velocimetry, providing a continuous time record. An array of single-mode optical fibers sends laser light through the lens system toward the surface. In one embodiment, the photonic Doppler velocimetry probe comprises a housing defining an interior space between a first end and a second end. One or more optic signal conductors is within the housing by entering through the second end and terminating within the interior space of the housing. The one or more optic signal conductors are configured to provide one or more optic signals to one or more lenses and a reflector in the probe. A ferrule maybe located within the housing. The ferrule may have one or more passages configured to receive and secure at least one of the one or more optic signal conductors to the ferrule.

In one embodiment an optic probe is disclosed for projecting light rays to a surface. The optic probe includes a housing defining an interior space between a proximate end and a distal end of the probe. One or more optic signal conductors enter the housing through the proximate end of the probe and terminate within the interior space of the housing. The one or more optic signal conductors are configured to provide optic signals to the probe. Also provided is a reflector having an open distal end and a reflective interior surface. A first set of lens are configured to receive the optic signals and present a first subset of optic signals to at least one second set of lenses and present a second subset of optic signal to the reflector. One or more additional lenses are adjacent the first set of lenses and are configured to direct the first subset of optic signals through the open distal end of the reflector. The second subset of optic signals bypass the one or more additional lenses to reflect from the reflective interior surface of reflector and out the open second end of the reflector.

In one embodiment, the one or more optic signal conductors are one or more optic fibers. The optic probe may be configured to perform photonic Doppler velocimetry measurement on a surface which receives the projected light rays. In one configuration, the reflector is a parabolic reflector having a mirrored interior surface. It is contemplated that the first set of lens may consist of a first lens group and second lens group such that both the first lens group and the second lens group are positive, and the one or more additional lenses consists of a third lens group that is a positive lens. In one embodiment, the first set of lenses and the one or more additional lenses are aligned along a central axis and the first set of optic signals exit the reflector at an angle that is closer to the central axis than the angle at which the first set of optic signals exit the reflector. Also part of the probe may be one or more supports configured to secure the one or more additional lenses within the reflector. In use, the reflector, the one or more additional lenses, and the first set of lenses are configured to receive a surface reflection of the optic signal from a curved surface and conduct the surface reflection back to the optic signal conductor.

Also disclosed is an optic lens system that includes a housing defining an interior space between a first end and a second end. One or more optic signal conductors that are configured to carry optic signals are within the housing. The optic signals may be defined as a first set of optic signals and a second set of optic signals. One or more lenses are also provided and are configured to receive at least the first set of optic signals from the one or more optic signal conductors. A reflector that has an open first end and an open second end is part of the system. The reflector has a surface extending between the open first end and the open second end and an interior of the surface being reflective. The reflector is configured to receive at least the second set of optic signals and reflect the second set of optic signals through the second open end of the reflector at a first angle. In this embodiment, the one or more lenses are configured to project at least the first set of optic signals through the open second end at a second angle such that the second angle is different from the first angle.

In one embodiment, the optic signals are projected to a curved surface which is the subject of photonic Doppler velocimetry measurement. The reflector and one or more lenses may be further configured to receive one or more surface reflections from the curved surface during movement of the curved surface. In one configuration, the housing contains one or more optic signal conductors and one or more lenses. It is contemplated that the one or more lenses comprises a first positive lens group, a second positive lens group and a third positive lens group. The first set of optic signals may pass through the first positive lens group, the second positive lens group and the third positive lens group while the second set of optic signals may pass through the first positive lens group and the second positive lens group but not the third positive lens group.

Also disclosed is a method, during photonic Doppler velocimetry, for presenting an optic signal to a curved surface and receiving a reflection from the curved surface during movement of the curved surface. In one implementation this method uses a probe that has a distal end facing the curved surface, the probe having a proximate end and distal end including at least one lens and a reflector. The reflector has an open distal end which faces the surface. The method generates optic signals and presents the optic signals to an optic signal conductor. The conductor passes the optic signal through the optic signal conductor to the at least one lens. The at least one lens separates the optic signals into a first set of optic signals and a second set of optic signals. The second set of optic signals reflects from an interior surface of a reflector due to the reflector having a reflective interior surface. The reflected second set of optic signals pass through the open distal end of the reflector toward the surface. The first set of optic signals pass through the open distal end of the reflector toward the surface without reflecting off the interior surface of the reflector. Movement of the curved surface is initiated and the system then receives one or more surface reflections of the first set of optic signals and the second set of optic signals. These surface reflections pass through the open distal end of the reflector and are reflected from the curved surface. The surface reflections then pass through at least one lens to the optic signal conductor.

In one embodiment the reflector comprises a parabolic reflector with a mirrored interior surface. The method of operation may further include processing the optic signals and the surface reflections to perform photonic Doppler velocimetry analysis to monitor movement of the curved surface. This may include passing the optic signal and the surface reflection through a circulator configured to perform as an optical directional coupler. In one embodiment, the at least one lens consists of a first lens group near the proximate end, a third lens group near the distal end, and a second lens group between the first lens group and the third lens group, such that the second set of optic signals do not pass through the third lens group.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Photonic Doppler velocimetry (PDV) with a novel light signal path is utilized to measure movement of a curved surface. PDV uses light scattered and reflected from a moving surface to continuously measure the movement of that surface. This method takes advantages of the Doppler principles.

As discussed above, drawbacks exist in the prior art with the probe that is used to present the light signal to the moving surface and collect the light signal from the moving surface. The probe structure and associated light path disclosed herein overcomes those drawbacks. In general, if the curved surface is collapsing on itself, the probe should be compact so the surface movement can be recorded over as much distance as possible before mechanical interferences compromise the data. In the embodiment disclosed herein there are one or more fiber-optic arrays which send light through lenses. A reflector receives at least some of the light while other aspects or portions of the light do not reflect from the reflector. After exiting the probe, the light is retro-reflected off the surface back into itself and into the probe.

Figure 1:
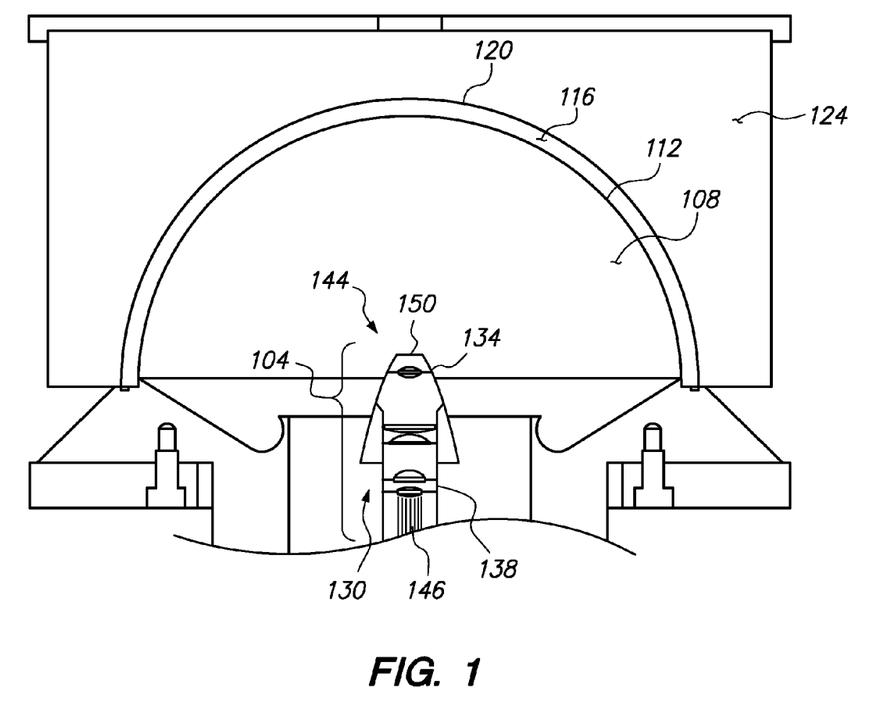
FIG. 1 illustrates a side view of an exemplary environment of use of the probe disclosed herein.

FIG. 1 illustrates a side view of an exemplary environment of use of the probe disclosed herein. This is but one possible environment of use and as such it is contemplated that other uses for the disclosed system may be arrived at by one of ordinary skill in the art.

As shown in FIG. 1, the probe assembly 104 is provided in the interior space 108 that is bounded by a curved interior surface 112 of a structure 116. The structure 116 is surrounded on an exterior surface 170 by a material 124. The material 124 may comprise any material that exerts a force on the surface 120 to thereby move the material 116 inward toward the probe assembly 104. In one embodiment, the material 124 comprises an explosive material that when detonated, implodes the interior surface 112 inward toward the probe assembly 104. Any other form may push the surface 112 toward the probe.

In other embodiments, it is contemplated that a material 124 other than explosives may be utilized such as, but not limited to heat, air pressure, liquid pressure, radiation, or any other type of force. The material 116 may comprise any type material or barrier. The interior area 108 may comprise any type material or void including but not limited to, a vacuum, air or other gas, or even other material, such as gel or liquid, or a solid compressible material.

It is also contemplated that the interior surface 112 may move outward, away from the probe assembly 104 instead of inward toward the probe assembly. In other embodiments, the surface may move in a non-uniform manner with a first portion of the surface 116 moving toward the probe assembly 104 and a second part of the surface moving away from the probe assembly.

On the exterior of the probe assembly 104 is a lens assembly 130 which rests in a parabolic reflector 134. The lens assembly 130 comprises one or more lens, discussed below in greater detail, which are contained in a parabolic reflector 134 and housing 138. The interior surface of the parabolic reflector is mirrored or otherwise reflective. In one embodiment, the lens assembly 130 and parabolic reflector 134 provide an ability to project light onto and receive light from the surface over a very wide range of angles. One or more fiber optic cables 146 are contained within a housing 138 to direct light to the lens assembly 130 and receive reflected light from the lens assembly. The end of the probe 104 closest to the surface 112 is the distal probe end. The opposite end of the probe, which is adjacent the fiber optic cables 146 is the proximate probe end.

In optics, a parabolic (or paraboloid or paraboloidal) reflector (or dish or mirror) is a reflective surface used to collect or project energy such as light, or radio waves. Its shape is part of a circular paraboloid, that is, the surface generated by a parabola revolving around its axis. The parabolic reflector transforms an incoming plane wave traveling along the axis into a spherical wave converging toward the focus. Conversely, a spherical wave generated by a point source placed in the focus is reflected into a plane wave propagating as a collimated beam along the axis. Parabolic reflectors are used to collect energy from a distant source (for example sound waves or incoming star light) and bring it to a common focal point, thus correcting spherical aberration found in simpler spherical reflectors. Since the principles of reflection are reversible, the parabolic reflectors described and used herein can also be used to both transit energy to the surface 112 but also collect the reflected energy.

In operation, prior to and during movement of the surface 112, light rays (or any other energy) are directed from the fiber optic cables 146 in the housing 138 to the lens assembly. Some of the light rays pass through all the lenses in the lens assembly 130 while other light rays bypass one or more lens of the lens assembly. The light rays that pass through all the lens project through the end of the parabolic reflector 134 without reflecting from or contacting the parabolic reflector. The light rays that bypass one or more lenses of the lens assembly 130 project through the end of the parabolic reflector 134 after first reflecting from the internal surface of the parabolic reflector. The parabolic configuration of the parabolic reflector 134 is such that light rays which bypass one or more lenses of the lens assembly are reflected through the opening 140 in the distal end 144 of the parabolic reflector.

The light rays then contact the surface 112 and the reflections return to the parabolic reflector opening 150 at the distal end 144 of the parabolic reflector 134. Depending on the entry angle of the light rights into the opening 150 at the distal end. The light rays are either received by the lens assembly 130 or received by an inner mirror surface of the parabolic reflector 134 and then reflected into the lens assembly. The lens assembly 130 then directs the reflected light into the fiber optic cables for processing as described below.

Figure 2:
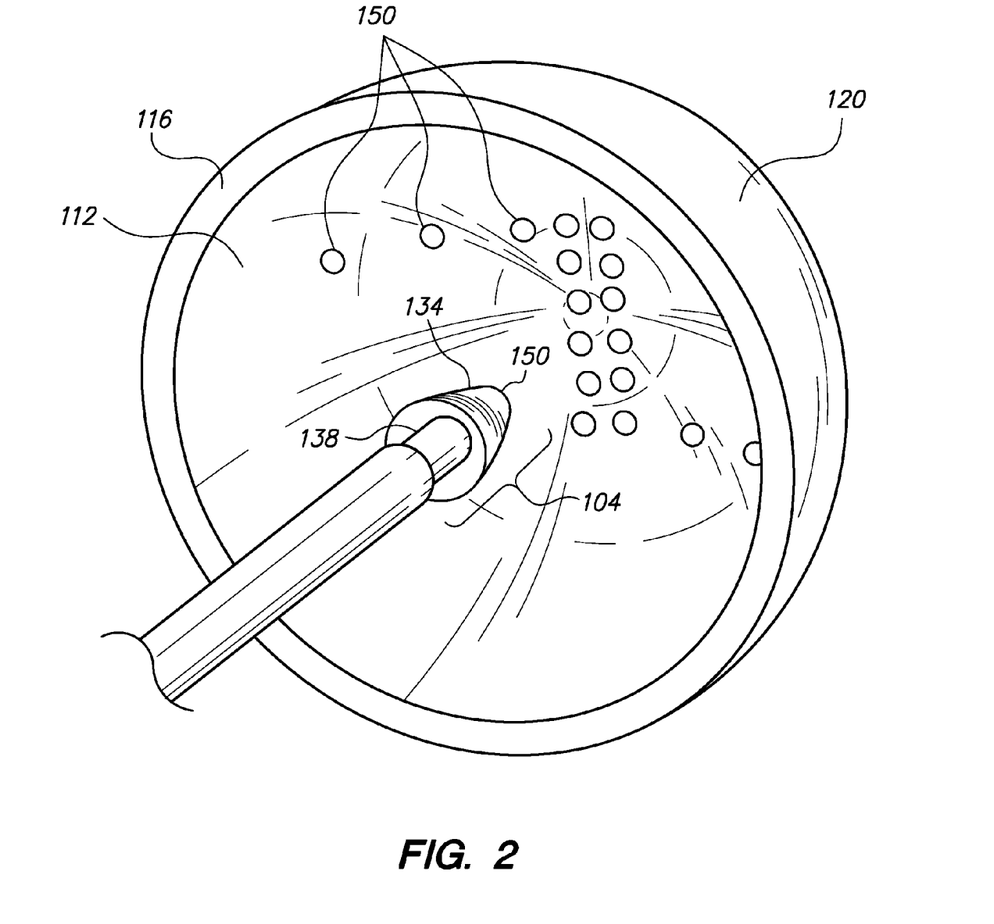
FIG. 2 illustrates a perspective view of the probe assembly and the interior surface.

FIG. 2 illustrates a perspective view of the probe assembly 104 and the interior surface 112. As compared to FIG. 1, similar elements are identified with identical reference numbers. As shown, the housing 138 of probe assembly 104 extends near or into the interior of the structure 116. The parabolic reflector 134 is at the distal end of the probe assembly 104 which faces the interior surface 112. The structure 116 has an interior surface 112 and an outer surface 120 which form a dome or spherical shape. Other shapes may be monitored. As discussed below in greater detail, the parabolic reflector 134 contains one or more lenses (not shown) which are configured to project one or more optic signals on the interior of the inner surface 112. These points of projection are shown by reflection points 150. These projection points 150 may be arranged at any point on the interior surface subject to the monitoring preferences. As discussed below in greater detail, the location of the reflection points is determined by the location and configuration of the lenses and the parabolic reflector 134. This is but one configuration for the surface 112 and probe 104.

Figure 3:
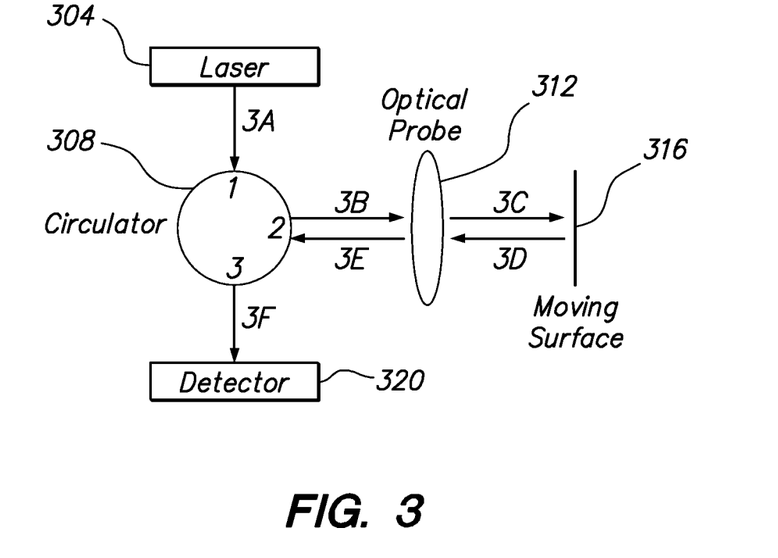
FIG. 3 is block diagram of an exemplary photonic Doppler velocimetry system.

FIG. 3 is block diagram of an exemplary photonic Doppler velocimetry system. As shown, a laser 304 generates a laser light output 3A which is provided to a circulator 308. The circulator outputs the laser light output 3B to an optical probe 312, such as the optic probe described herein, which in turn projects the laser light 3C to a moving surface 316. The reflection 3D is reflected back to the optical probe 312, and then as signal 3E to the circulator 308 where it is directed to the detector 320.

PDV is a fast-time-response Michelson interferometer made up of fiber-optic components. The beam splitter of the Michelson interferometer has been replaced with a fiber-optic circulator. In this example embodiment, the circulator performs as an optical directional coupler for the input light (3A) on fiber port 1. This light (3B) exits port 2 and is transported to an optical probe 312. The incident light (3C) is reflected from the moving surface (3D) and collected by the same optical probe. The light (3E) reenters the same fiber and reenters port 2, where it is directed inside the circulator out port 3. Back reflections from the probe itself (or through mixing with an external reference laser source) provide the unshifted (reference) light. Thus, the reference light travels back in the same fiber as the Doppler-shifted light (3D) to produce the mixed light (3E) that is presented to the detector (through fiber path 3F). It is possible to track and determine the distance moved by the surface illuminated by the PDV by counting fringes. In the example embodiment described herein, a velocity of 1 km/s corresponds to a recorded frequency of ~1.29 GHz.

The velocity measuring technique known as photonic Doppler velocimetry (PDV) is a method to measure surface velocities between a few mm/s up to 14 km/s, though the technology is developing and expected to measure higher velocities soon. In one embodiment, the PDV probe uses single-mode fibers to both transmit and receive interrogating light beams. The probe, comprising the housing, lenses, and parabolic reflector conducts the light from the fiber optic cable to the surface being monitored ad also receive the reflection. The system described herein makes use of 1550 nm continuous wave (CW) fiber lasers, detectors, and digitizers.

In one example embodiment, the minimum beam waist is set at 35 mm in front of the curved surface. In one embodiment, the light emitted by the fibers is telecentric and effective focal length of the lens is at 6 mm while the magnification is at 11.2×. The spacing between the lenses were set to a minimum value while still preventing lenses from touching, which allowed the anti-reflective coating to minimize back reflections.

In use, the Doppler-shifted light from the moving surface is compared to unshifted light to create fringes in a Michelson interferometer made up of fiber-optic components. Then, a fiber-optic circulator is used as the beam splitter of the interferometer. Reference (unshifted) light is provided through mixing with an external reference laser source or from back reflections in the probe itself. A PDV probe lens or bare fiber both transmits and receive the laser light. In one embodiment, a 1550 nm telecommunications wavelength, continuous-wave (CW) fiber laser is used with matching fiber, fiber related devices, optic detectors, and signal digitizers.

Figure 4:
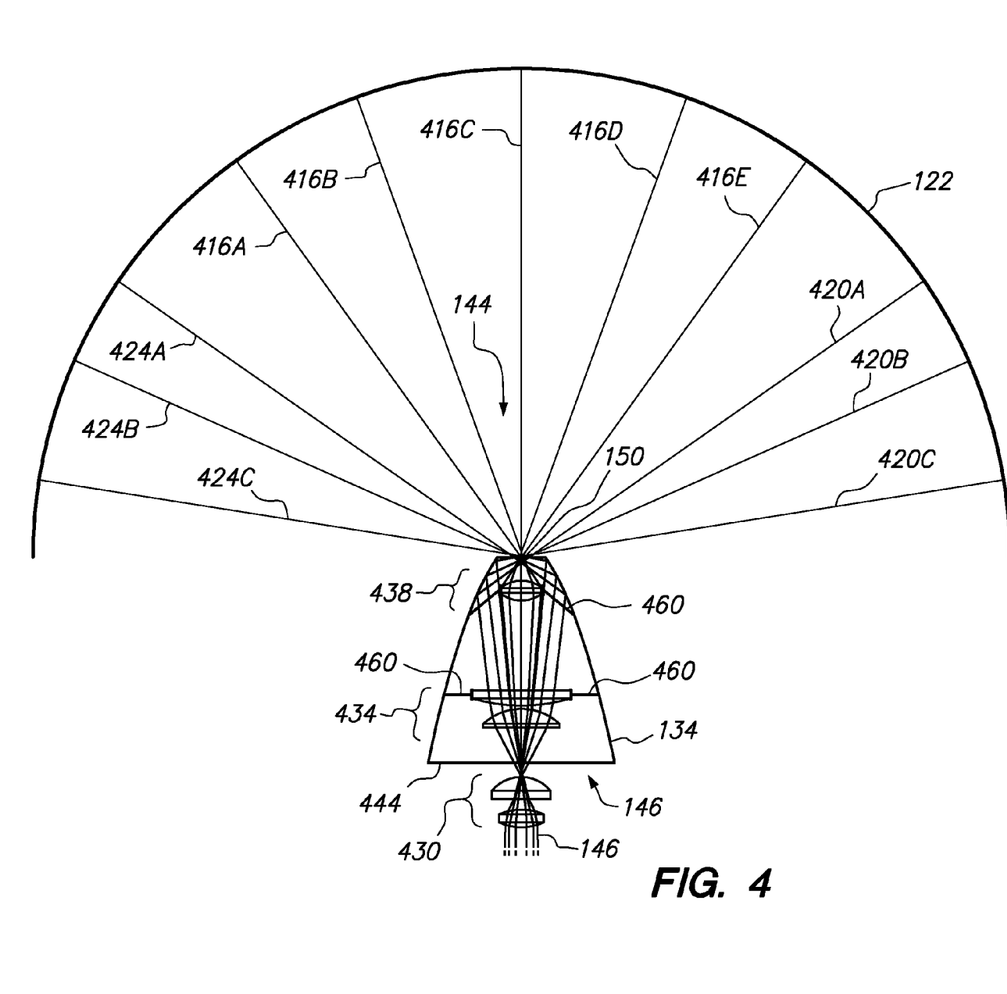
FIG. 4 illustrates a side view of the parabolic reflector with lens groups, showing light path projection to a surface.

FIG. 4 illustrates a side view of the parabolic reflector with lens groups, showing light path projection to a surface. In this figure, the lens assembly and parabolic reflector 134 are shown in greater detail, in relation to the surface 112. The fiber optic cables 146 are shown below the lenses 430, 434, 438.

In this example embodiment, the light from the fiber optic cables 146 is directed into a first lens group 430. The first lens group 430 may comprise one or more lenses configured as a positive lens group. In this embodiment the first lens group 430 consists of two lenses as shown, but in other embodiments other number of types of lenses may be used. After the first lens group 430 is a focal stop.

A second lens group 434 receives the light from the first lens group 430 and is generally optically aligned with the first lens group. In this embodiment the second lens group consists of two lenses configured as a positive group, but in other embodiments other number of types of lenses may be used.

After the second lens group 434 is a third lens group 438. The third lens group 438 is a positive lens group. In this embodiment the third lens group 438 is a single lens.

Surrounding at least one lens of the lens groups 430, 434, 438 is a reflector 134. The reflector may comprise any type reflector, but in this embodiment it is a parabolic reflector configured with a mirrored interior surface. The reflector 134 is symmetric about a center axis and has a surface that extends between a proximate end 148 and a distal end 144. A proximate end opening 444 and a distal end opening 150 define both the opposing ends of the reflector 134. The open ends 150 and 148 allow light rays to enter and exit the reflector 134. In this embodiment, shape of the reflector is parabolic to achieve light ray reflection as set forth below.

The first lens group 430 and the second lens group 432 work in cooperation to direct a first set of light rays through the third lens group 438 while directing a second set of light rays to bypass the third lens group. Instead, the second set of light rays reflect off the mirrored or reflective interior surface of the reflector 134. By having the second set of light rays avoid the third lens group and instead reflect off the interior surface of the reflector 134, a wider angle of light ray paths may be achieved.

Several light ray paths between surface 112 and the opening 140 at the distal end 144 of the reflector. These light rays are identified above as a first set of light rays and a second set of light rays. As shown, the first set of light rays include light rays 416A-416D. These light rays all pass through the third lens group 438. Due to the refractive nature of the lens 438, 434, 430 the first set of light rays 416 are generally directed to the center area of the surface 112 as shown.

Also defined above are a second set of light rays which bypass the third lens group 438. The second set of light rays is shown as light rays 424A-424C and 420A-420C. These light rays, when exiting the second lens group, are refracted in such a way as to miss the third lens group 438 and instead hit the interior surface of the reflector 134. The angle at which these second set of light rays 424A-424C and 420A-420C exit the second lens group is such to avoid the third lens group 438 and instead contact the reflector. The angle of reflection directs the light rays 424A-424C and 420A-420C at a more shallow angle (than the first set of light rays) to thereby contact the outer areas of the surface 112 other than then center areas.

The combination of the first set of light rays 416A-416D and the second set of light rays 424A-424C and 420A-420C achieves a will and full coverage area for the interior surface 112. This results in measurements being conducted over many diverse locations of the surface 112 to thereby provide the data at many points.

One or more of the lenses may be supported and contained within the housing (shown in FIGS. 1 and 2). For example, the first lens group 430 may be within the housing. One or more supports 460 may be provided between one or more lens 434, 438 and the reflector 138 to support and hold the lenses. The housing may not be suitable to hold all the lenses because the light rays extend beyond the sides of the second and third lens groups 434, 438. The supports may be thin or constructed of bars which do not extend around the entire circumference of the reflector 134 as such would not block the light rays, or only block a small number of light rays.

Figure 5A:
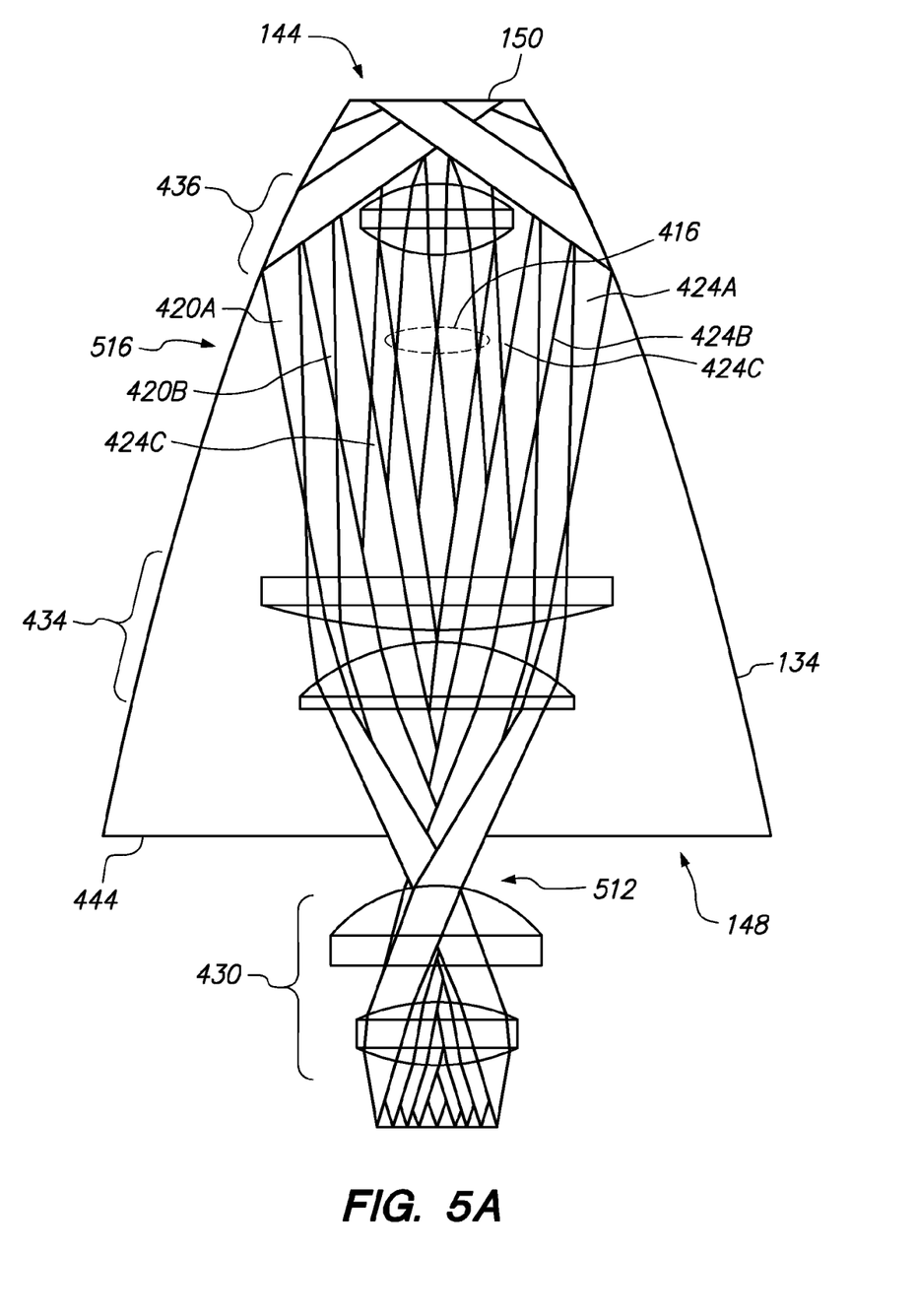
FIG. 5A illustrates an enlarged view of the parabolic reflector with lens groups showing multiple light rays paths.

FIG. 5 illustrates an enlarged view of the parabolic reflector with lens groups showing light rays paths. This embodiment is generally similar to the embodiment of FIG. 4 and as such, similar elements are identified with identical reference numbers. As the focus of FIG. 5 is on the light paths, elements which are discussed above in connection with the other figures are not discussed again.

As shown, the light energy from the fiber optic cables (not shown) enters the first lens group 430 which refracts and directs the light to the second lens group 434. The light rays which avoid the third lens group 438 are light rays in paths 420 and 424. Light rays in group 416 pass through the third lens group 438.

FIG. 5 further shows the optical stop 512 near the first lens group 430. An intermediate image surface is formed in the general area 516. In this embodiment the image surface is not in a single plane.

Figure 5B:
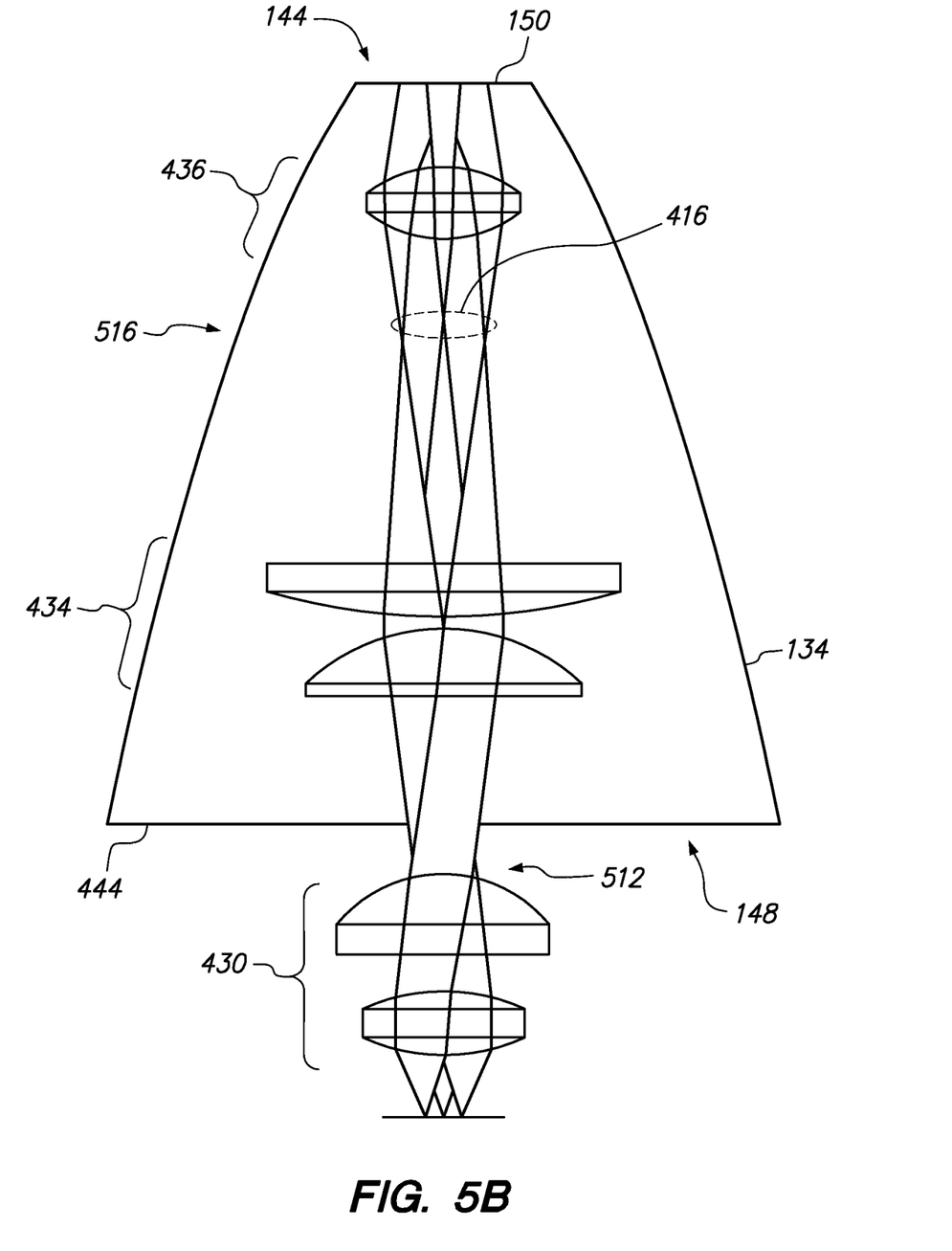
FIG. 5B illustrates an enlarged view of the parabolic reflector with lens groups showing a first subset of light rays paths which do not reflect from the reflector.
Figure 5C:
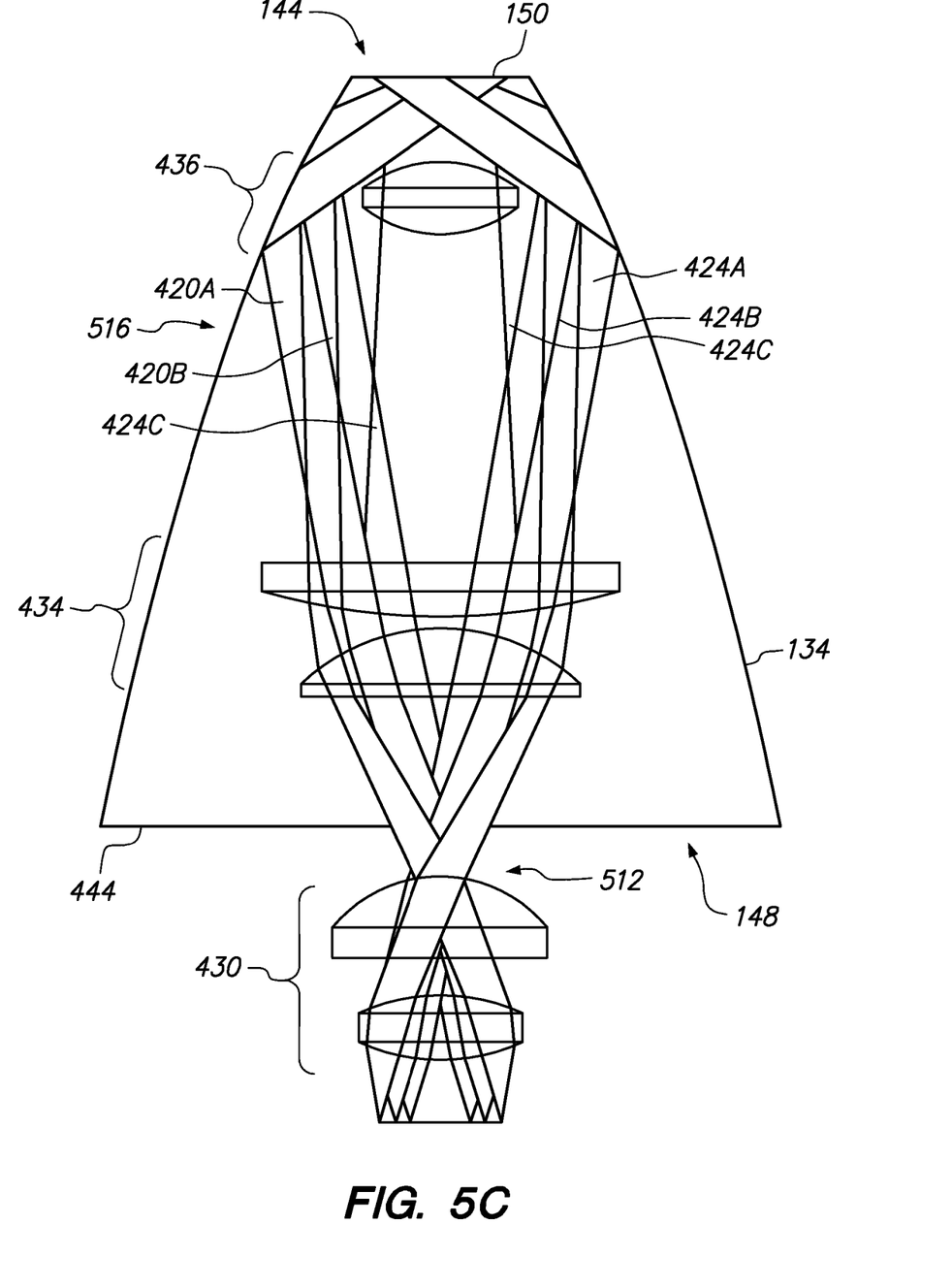
FIG. 5C illustrates an enlarged view of the parabolic reflector with lens groups showing a second subset of light rays paths which generally bypass a third lens group.

FIGS. 5B and 5C separate out the first subset of light rays and the second subset of light rays that are shown in FIG. 5A. FIG. 5B illustrates an enlarged view of the parabolic reflector with lens groups showing only the first subset of light rays paths which do not reflect from the reflector. As compared to FIG. 5A, identical elements are identified with identical reference numbers. Elements discussed in FIG. 5A are not discussed again. To reduce the complexity and to aid in understanding, in FIG. 5B, only the light ray paths 416 that pass through the third lens group 416 are shown. The second subset of light rays which do not primarily pass through the third lens group are not shown in FIG. 5B. As can be seen, a first set of light rays pass through all the lenses 430, 434, and 436 and do not reflect off of the reflector 134.

FIG. 5C illustrates an enlarged view of the parabolic reflector with lens groups showing only the second subset of light rays paths which generally bypass a third lens group. As compared to FIG. 5A, identical elements are identified with identical reference numbers. Elements discussed in FIG. 5A are not discussed again. To reduce the complexity and to aid in understanding, in FIG. 5C, only the light ray paths 420, 424 that reflect off of the interior surface of the reflector are shown. The first subset of light rays which pass through the third lens group are not shown in FIG. 5B. Removing the first subset of light rays 416 aids in understanding and makes the light ray paths more clear. As can be seen, a second set of light rays pass 420, 424 through the lenses 430, 434, but not all of these light rays pass through lens group 436. All or most of the second set of light rays 420, 424 reflect off of the reflector 134 before exiting the second end 150.

As an advantage over the prior art, such as electrical pins or individual optical probes, the lens system has the advantage of nearly complete coverage of the hemisphere, shown in FIGS. 1 and 2, with a higher density of measurement points. This lens system disclosed herein exhibits a novel parallel-path design that uses both refractive and reflective components. In one exemplary embodiment light from fibers within a central disk are relayed through three lens groups the first lens group, a second lens group and a third lens group. In this embodiment, the first lens group brings the light to a common non-physical stop. The second lens group focuses light, from the optical stop established by the first lens group, to an intermediate image surface. In one embodiment the third lens group is a high power asphere, which is a specific type of positive group. In other embodiments other types of positive groups may be used. The third lens group may be configured to re-image the fibers at infinity, thereby collimating light from individual fibers with high angular magnification.

A non-physical stop is imaged after the third lens group to produce a virtual stop. Light from fibers within an outer annulus is relayed through the first and second lens groups, but some of the light is re-imaged via a parabolic reflector positioned such that its mathematical focus point is at the top surface (distal end of the reflector) produced by the third lens group such that reflected light passes through the same virtual stop.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. An optic probe for projecting light rays comprising
   a housing defining an interior space between a proximate end and a distal end;
   one or more optic signal conductors entering the housing through the proximate end and terminating within the interior space of the housing, the one or more optic signal conductors configured to provide optic signals to the probe;
   a reflector having an open distal end and a reflective interior surface;
   a first set of lens configured to receive the optic signals and present a first subset of optic signals to at least one second lens and present a second subset of optic signal to the reflector;
   one or more additional lenses adjacent the first lens configured to direct the first subset of optic signals through the open distal end of the reflector, wherein the second set of optic signals bypass the one or more additional lenses to reflect from the reflective interior surface of reflector and out the open second end of the reflector.

2. The probe of claim 1 wherein the one or more optic signal conductors are one or more optic fibers.

3. The probe of claim 2 wherein the optic probe for projecting light rays is configured to perform photonic Doppler velocimetry measurement on a surface which receives the projected light rays.

4. The probe of claim 3 wherein the reflector is a parabolic reflector has a mirrored interior surface.

5. The probe of claim 1 wherein the a first set of lens consists of a first lens group and second lens group, both the first lens group and the second lens group being positive, and the one or more additional lenses consists of third lens that is a positive lens.

6. The probe of claim 5 wherein the first set of lenses and the one or more additional lenses are aligned along a central axis and the first set of optic signals exit the reflector at an angle that is closer to the central axis than the angle at which the first set of optic signals exit the reflector.

7. The probe of claim 1 further comprising one or more supports configured to secure the one or more additional lenses within the reflector.

8. The probe of claim 1 wherein the reflector, the one or more additional lenses, and the first set of lenses are configured to receive a surface reflection of the optic signal from a curved surface and conduct the surface reflection back to the optic signal conductor.

9. An optic lens system for projecting light rays comprising
   a housing defining an interior space between a first end and a second end;
   one or more optic signal conductors configured to carry optic signals, the optic signal comprising a first set of optic signals and a second set of optic signals;
   one or more lenses configured to receive at least the first set of optic signals from the one or more optic signal conductors;
   a reflector having an open first end and an open second end with a surface extending between the open first end and the open second end and an interior of the surface being reflective, the reflector configured to receive at least the second set of optic signals and reflect the second set of optic signals through the second open end of the reflector at a first angle;

wherein the one or more lenses are configured to project at least the first set of optic signals through the open second end at a second angle, the second angle being different from the first angle.

10. The system of claim 9, wherein the optic signals are projected to a curved surface which is the subject of photonic Doppler velocimetry measurement.

11. The system of claim 10 wherein the reflector and one or more lenses are further configured to receive one or more surface reflections from the curved surface during movement of the curved surface.

12. The system of claim 9 wherein the one or more optic signal conductors comprise one or more optic fibers.

13. The system of claim 9 wherein the housing contains one or more optic signal conductors and one or more lens.

14. The system of claim 9 wherein the one or more lenses comprises a first positive lens group, a second positive lens group and a third positive lens group.

15. The system of claim 9 wherein the first set of optic signals pass through the first positive lens group, a second positive lens group and a third positive lens group while the second set of optic signals pass through the first positive lens group and the second positive lens group but not the third positive lens group.

16. A method, during photonic Doppler velocimetry, for presenting an optic signal to a curved surface and receiving a reflection from the curved surface during movement of the curved surface comprising:

establishing a distal end of a probe facing the curved surface, the probe having a proximate end and distal end including at least one lens and a reflector, the reflector having an open distal end which faces the surface;

generating optic signals;

presenting the optic signals to an optic signal conductor, passing the optic signal through the optic signal conductor to the at least one lens, the at least one lens separating the optic signals into a first set of optic signals and a second set of optic signals;

reflecting the second set of optic signals from an interior surface of a reflector, the reflecting having a reflective interior surface, the reflected second set of optic signals passing through the open distal end of the reflector toward the surface;

passing the first set of optic signals through the open distal end of the reflector toward the surface;

initiating movement of the curved surface;

receiving one or more surface reflections of the first set of optic signals and the second set of optic signals through the open distal end of the reflector, the surface reflections being reflected from the curved surface;

passing the one or more surface reflections through at least one lens to the optic signal conductor.

17. The method of claim 16 wherein the reflector comprises a parabolic reflector with a mirrored interior surface.

18. The method of claim 17 further comprising processing the optic signals and the surface reflections to perform photonic Doppler velocimetry analysis to monitor movement of the curved surface.

19. The method of claim 17 further comprising passing the optic signal and the surface reflection through a circulator configured to perform as an optical directional coupler.

20. The method of claim 17 wherein the at least one lens consists of a first lens group near the proximate end, and a third lens group near the distal end, and a second lens group between the first lens group and the third lens group, such that the second set of optic signals do not pass through the third lens group.

* * * * *